United States Patent [19]

Barnes

[11] Patent Number: 4,811,415

[45] Date of Patent: Mar. 7, 1989

[54] DIGITAL SCALING ACCESSORY

[75] Inventor: Brian M. Barnes, Sydney, Australia

[73] Assignee: Zimbost Pty. Limited, Kareela, Australia

[21] Appl. No.: 948,303

[22] PCT Filed: Apr. 2, 1986

[86] PCT No.: PCT/AU86/00087
§ 371 Date: Nov. 13, 1986
§ 102(e) Date: Nov. 13, 1986

[87] PCT Pub. No.: WO86/05904
PCT Pub. Date: Oct. 9, 1986

[30] Foreign Application Priority Data

Apr. 2, 1985 [AU] Australia ............................... PG9993

[51] Int. Cl.$^4$ ............................................... G06K 9/00
[52] U.S. Cl. .......................................... 382/59; 178/18; 235/483
[58] Field of Search ................. 382/59; 340/707, 708, 340/709, 710; 178/18, 19, 20; 353/95; 235/483

[56] References Cited

U.S. PATENT DOCUMENTS

| 886,695 | 5/1908 | Grenier | 33/1 N |
| 2,190,071 | 2/1940 | Keppers | 235/85 R |
| 3,229,075 | 1/1966 | Palti | 382/59 |
| 3,923,390 | 12/1975 | Susko | 353/95 |
| 4,188,101 | 2/1980 | Masuda | 353/95 |
| 4,260,852 | 4/1981 | Fencl | 178/19 |
| 4,548,486 | 10/1985 | Mosley | 353/95 |
| 4,561,183 | 12/1985 | Shores | 178/18 |
| 4,600,807 | 7/1986 | Kable | 178/19 |

OTHER PUBLICATIONS

Gardner et al., "Paper Menus and Keyboards for Digitizing Tablets", IBM Technical Disclosure Bull., vol. 18, No. 5, Oct. 1975, pp. 1589–1592.

Primary Examiner—Leo H. Boudreau
Attorney, Agent, or Firm—Beveridge, DeGrandi & Weilacher

[57] ABSTRACT

In the computer scaling and cropping of artwork where the artwork is mounted on a digitizer tablet and a digitizer cursor moved in relation to the artwork to provide dimensional and angular data for the computer, a guide (10) comprises formations (15a, 15b, 15c) for the location of the cursor body and marking edges (13, 14) aligned with the cursor center.

7 Claims, 2 Drawing Sheets

DIGITAL SCALING ACCESSORY

FIELD OF THE INVENTION

This invention relates to apparatus for facilitating the use of a digitizer tablet or the like in the scaling, cropping and aligning of artwork, pictures or other material for magazines and other publications.

BACKGROUND TO THE INVENTION

In the preparation of artwork for printing, particularly in the production of colour separations for magazines, posters and other media from originals such as transparencies or prints, it is normally required to modify the original both in its scale, by enlargement or reduction, and to select the area of the original to bee reproduced, by cropping. It may also be necessary to modify the angular disposition of the subject relative to the boundaries of the original, either to correct for errors or to produce an artificial image. In the prior art, these measurements and calculations have been carried out manually, with consequent inaccuracy and cost.

An object of the present invention is to provide devices which facilitate the use of a digital computer in such operations, by linking the movement of a cursor or the like over the original, with a computer providing real-time calculation of the scaling required, and automatic recordal of the scaling parameters.

SUMMARY OF THE INVENTION

For use with apparatus for the scaling and cropping of an artwork subject in which said subject is mounted on a digitizer tablet and a digitizer cursor is moved relative to said subject, said tablet providing data as to the position of the cursor centre for real-time scaling calculations and for the marking of said subject for cropping of the image thereon by the use of data processing means connected with said tablet, the invention broadly comprises cursor support and cropping guide means comprising a generally planar body, locating means on said body for the location thereon of said cursor, and at least one pair of orthogonal marking edges, the intersection of the lines containing said edges being coincident with said cursor centre.

Preferably, the device defines two such pairs of marking edges, with one of the edges of each pair lying on the same line as an edge of the other pair.

The invention also provides a device for rotational orientation of the subject, comprising a planar member adapted for mounting on a digitizer tablet, the member having a rotatable portion adapted for the mounting thereon of a transparency or artwork, with angle indicating indicia showing the relative orientation of the rotatable portion and the planar member.

BRIEF DESCRIPTION OF THE DRAWINGS

To facilitate an understanding of the present invention, embodiments are shown, by way of example only, in the accompanying drawings, in which.

DESCRIPTION OF PREFERRED EMBODIMENTS

Figure 1:
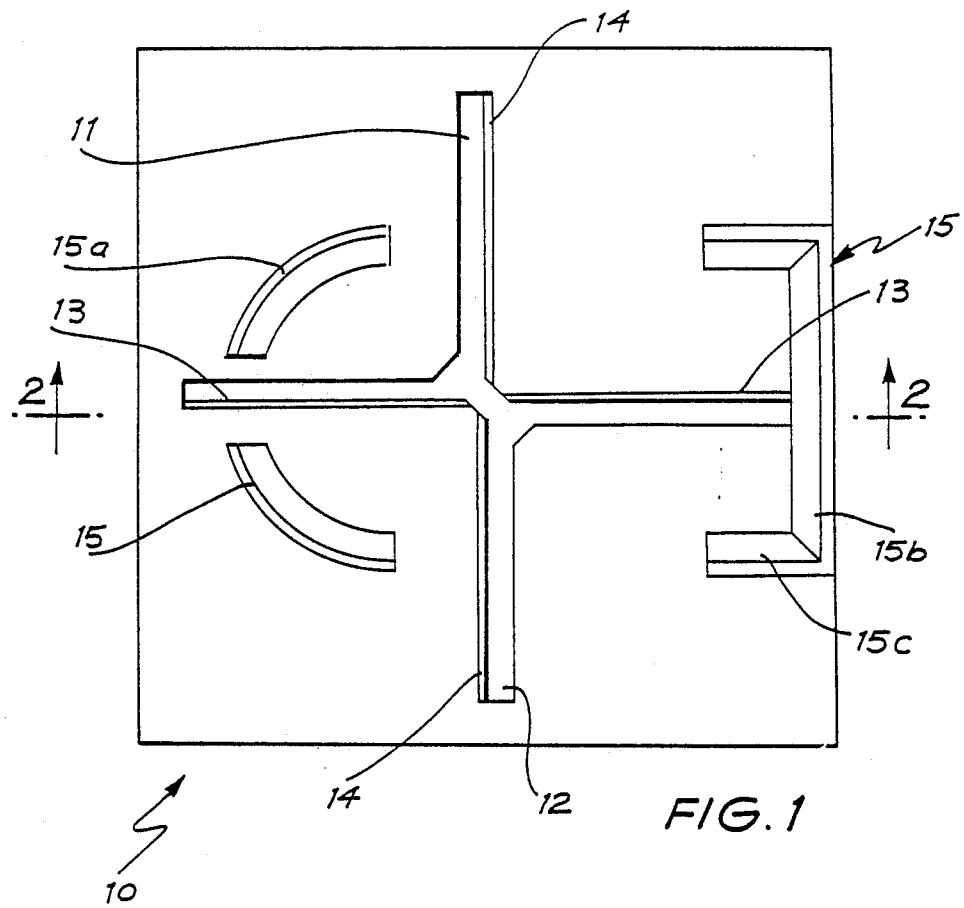
FIG. 1 is a plan view of a cropping and scaling device incorporating the present invention.
Figure 2:
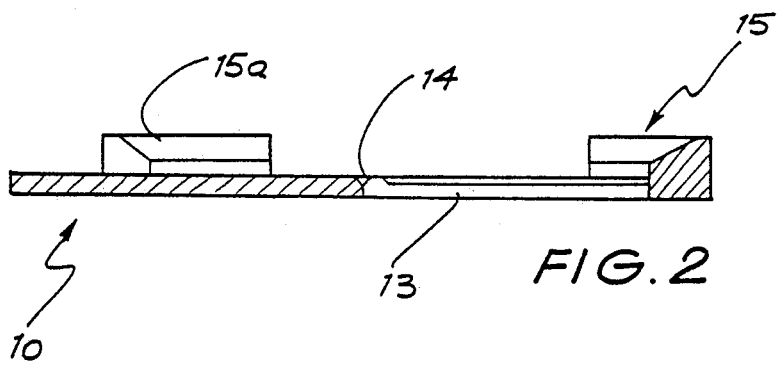
FIG. 2 is a sectional elevation taken on the line 2—2 of FIG. 1.

In the embodiment shown in FIGS. 1 and 2, a planar member 10 of transparent plastics material is provided with a pair of L-shaped cut-out areas 11 and 12 having aligned pairs of sides 13 and 14.

If now a digitizer cursor (not shown) is mounted on the member 10 with its centre point (that is to say the junction of its cross-hairs) accurately registered with the intersection of the lines containing the sides 13 and 14, these sides will provide surfaces aligned with the cursor position for marking of the artwork, for example, as it is matched to a frame which may be displayed on the video terminal of a computer processing output data from the digitizer.

Upstanding formations 15 are provided, in this embodiment in the form of wall-like elements, shaped and located to suit the cursor to be employed, so that the cursor may accurately be mounted on the member 10 and retained in correct registration with the edges 14. In the illustrated embodiment, the formations 15 comprise a pair of arcuate walls 15a for engagement with the semi-circular forward end of the body of a digitizer cursor, and wall portions 15b and 15c disposed to engage the rectangular rearward end of the cursor body. Other configurations of the formations will of course be employed, to suit the shape of the body of the cursor employed.

Figures 3, 4:
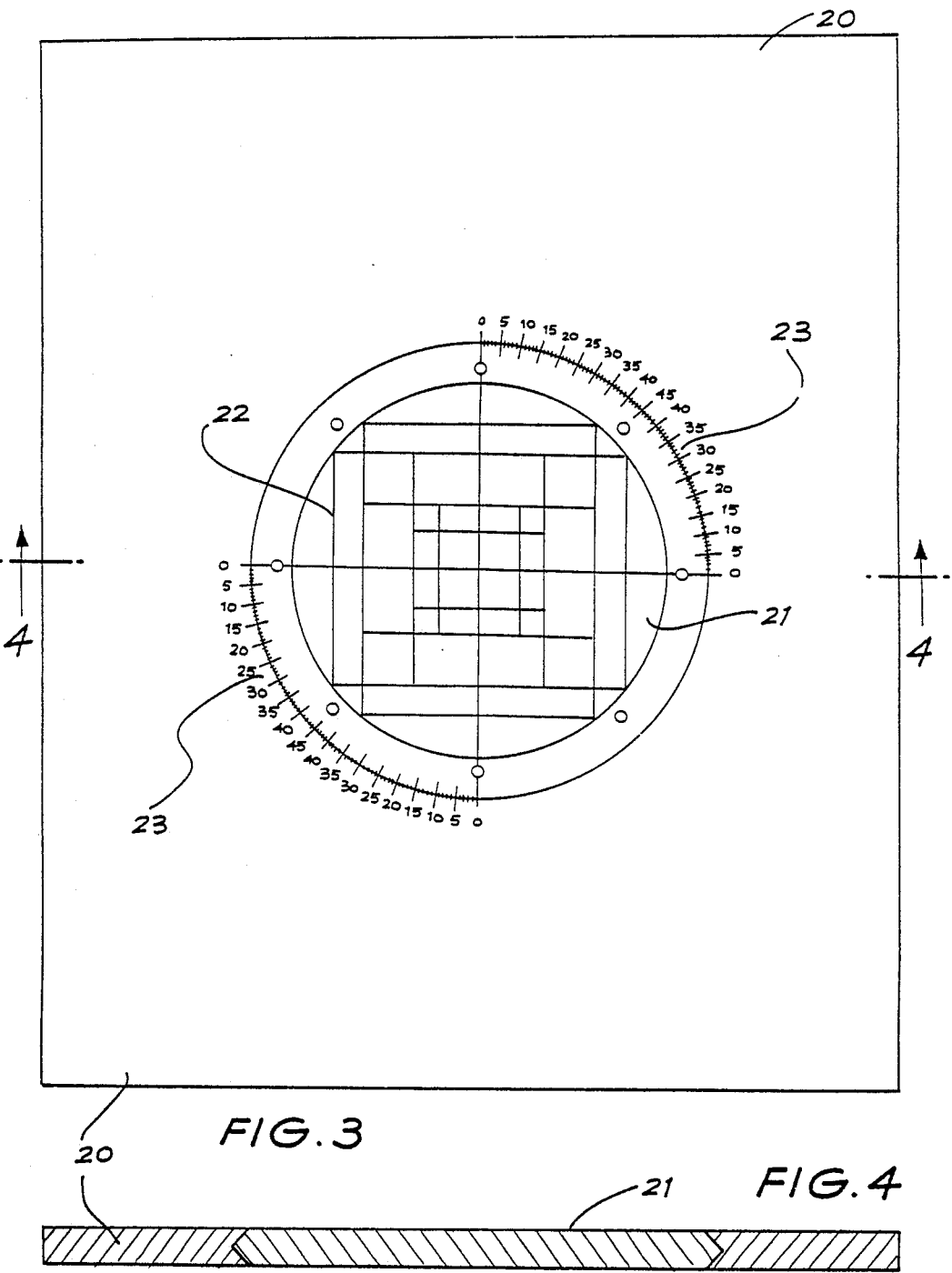
FIG. 3 is a plan view of a protractor device for use in conjunction with the device of FIG. 1.
FIG. 4 is a sectional elevation taken on the line 4—4 in FIG. 3.

In FIGS. 3 and 4 there is illustrated, by way of example, an embodiment of another aspect of the invention which enables the orientation of a transparency or other work-piece, in conjunction with a digitizer and angle-determining software.

The device shown in FIGS. 3 and 4 comprises a planar member 20 of transparent plastics material, which is provided with a central circular aperture in which is mounted for rotation relative to the member 20, a circular member 21, also of transparent plastics material.

The member 21 is provided with grid lines 22 corresponding to the standard sizes of photographic transparencies, to facilitate the alignment of transparencies or other material on the portion 21.

In at least one quadrant, angle marking indicia such as 23 are provided, so that the portion 21 may be set at a specific angle relative to the portion 20.

By plotting a pair of points on a transparency mounted on the portion 21, and by plotting the same points on a work-piece mounted elsewhere on the digitizer tablet or elsewhere on the member 20, the relative orientation of the line joining those points may be compared, and the transparency set to the correct angle, for subsequent operations, such as cropping employing the device of FIG. 1.

It will be appreciated that the invention can be carried into effect in ways other than those which have been exemplified in the drawings.

I claim:

1. A cursor support and cropping guide device for use with apparatus in the scaling and cropping of art subject matter in which the subject matter is mounted on a digitizer tablet and a digitizer cursor is moved relative to the subject matter, the cursor having a cursor body with a cursor center for both real-time scaling calculation and the marking of the subject matter for cropping of the image thereon by use of a data processing means in connection with the digitizer tablet, said device comprising:

(a) a generally planar guide body having formed therethrough at least one pair of orthogonal slots, each of said orthogonal slots being formed with a sloped edge;

(b) locating means on said guide body for fixing the cursor body supported thereby into a position in which the cursor center of the cursor body is coincident with the point of intersection of lines lying planar on the lower most portion of each of said sloped edges.

2. A device according to claim 1 wherein said at least one pair of orthogonal slots open into one another.

3. A device according to claim 1 wherein said guide body is transparent.

4. A device according to claim 1 wherein said guide body has two pairs of orthogonal slots with each slot including a sloped edge.

5. A device according to claim 4 wherein each of said orthogonal slots opens into the other and the sloped edges of each pair of orthogonal slots are aligned such that a line lying planar on a sloped edge of a slot of a first of said two pairs of orthogonal slots lies planar with a sloped edge of a slot of the second of said two pairs of orthogonal slots.

6. A cursor support and cropping guide system for use with apparatus in the scaling and cropping of art subject matter in which the subject matter is mounted on a digitizer tablet and a digitizer cursor is moved relative to the subject matter, the cursor having a cursor body with a cursor center for both real-time scaling calculation and the marking of the subject matter for cropping of the image thereon by use of a data processing means in connection with the digitizer tablet, said system comprising:

(a) a generally planar guide body having formed therethrough at least one pair or orthogonal slots, each of said orthogonal slots being formed with a sloped edge;

(b) locating means on said guide body for fixing the cursor body supported thereby into a position in which the cursor center of the cursor body is coincident with the point of intersection of lines lying planar on the lower most portion of each of said sloped edges;

(c) a device for the rotational orientation of the subject matter, said device including a planar member adapted for mounting on the digitizer tablet, said planar member having a rotatable portion adapted to support a transparency or art subject matter thereon and said planar member further including angle indicating indicia showing the relative orientation of said rotatable portion and said planar member.

7. A cursor support and cropping guide system as recited in claim 6 wherein said rotatable portion has indicia thereon including a plurality of parallel longitudinally extending grid lines interconnecting with a plurality of parallel transversely extending grid lines.

* * * * *